Dec. 22, 1925.  1,566,493

A. McKAY

GRAIN LOADER FOR VESSELS OR THE LIKE

Filed March 29, 1924

INVENTOR
ALEXANDER McKAY
BY Fetherstonhaugh & Co
ATTORNEYS

Patented Dec. 22, 1925.

1,566,493

UNITED STATES PATENT OFFICE.

ALEXANDER McKAY, OF MONTREAL, QUEBEC, CANADA.

GRAIN LOADER FOR VESSELS OR THE LIKE.

Application filed March 29, 1924. Serial No. 702,869.

*To all whom it may concern:*

Be it known that I, ALEXANDER McKAY, a subject of the King of Great Britain, and resident of the city of Montreal, in the Province of Quebec and Dominion of Canada, have invented certain new and useful Improvements in Grain Loaders for Vessels or the like, of which the following is a full, clear, and exact description.

This invention relates to new and useful improvements in grain loaders and trimmers and is particularly adaptable for loading grain into the holds of vessels or like containers, and the object of the invention is to provide a simple, inexpensive and efficient means for loading grain in the hold of a vessel in an even manner, so that no hand trimming will be required to even up the loading of the vessel.

Another object is to provide a portable device of the character stated which will be very simply attached to any vessel hold.

A further object is to provide a loader which will be very easily controlled and which will fill all corners of the hold with grain while operating.

In my invention, I provide a receiving hopper, which is mounted on a framework simply and easily attached to the sides of the hatchway over the hold of a vessel. Depending from the underside of the hopper is a plurality of feed spouts, said spouts being adapted to guide grain on to a revolving dished disc, which throws the grain toward the sides of the hold and fills the corners and sides of the hold first. Valves are provided to control the rate of feed through said spouts.

In the drawings which illustrate my invention:—

Figures 1, 2, 3:
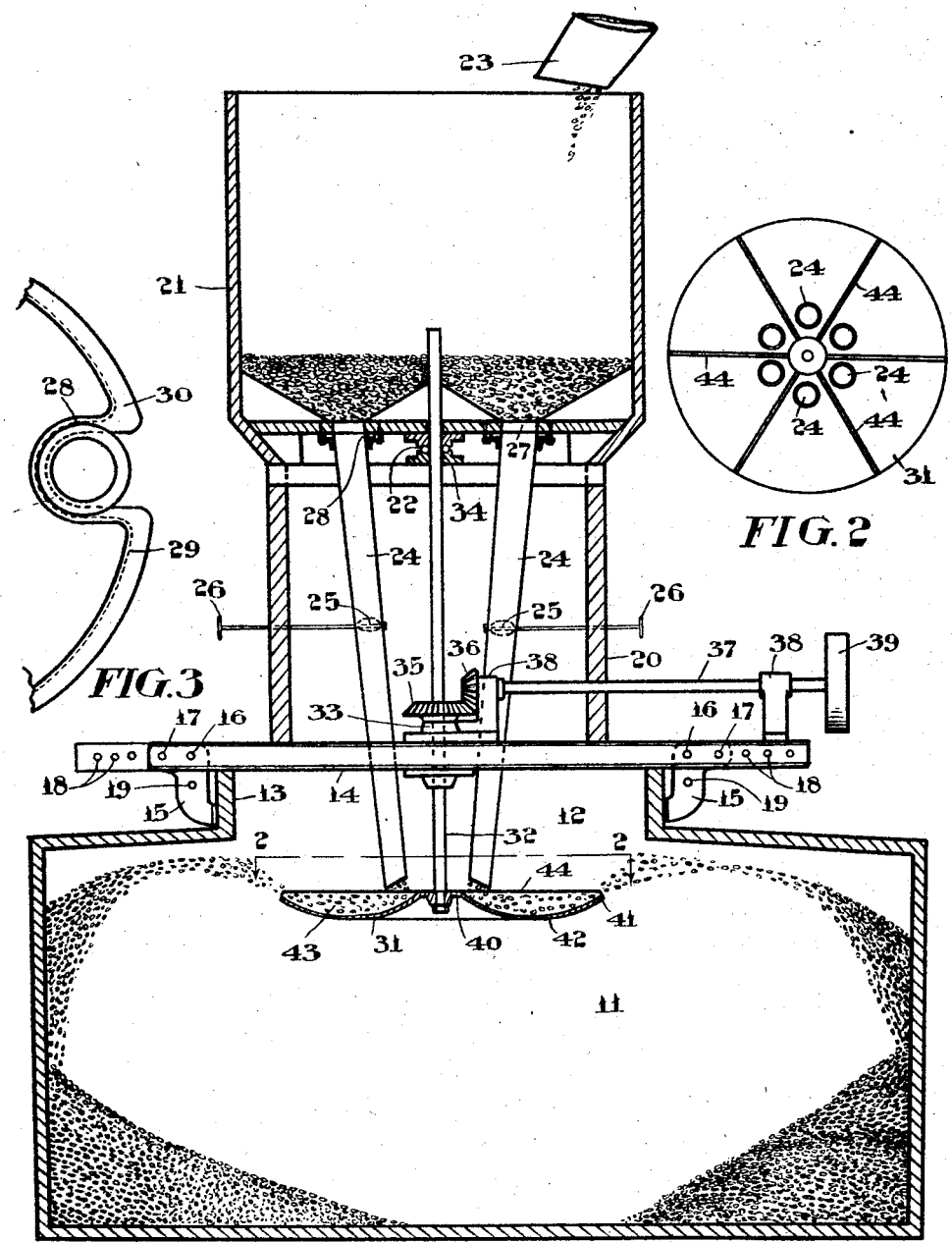
Fig. 1 is a sectional elevation of the grain unloader.
Fig. 2 is a plan view of the disc and feed spouts taken on the line 2—2, Figure 1.
Fig. 3 is a plan view of the connection of the feed spout to the hopper.

Referring more particularly to the drawings, 11 designates the hold of a vessel and 12 the hatchway having the usual upwardly extending sides 13. Mounted on the top of the sides is the frame 14 made of channel or similar shape. The channel may be attached to the sides by the pawl grips 15, which are pivotally mounted on the pins 16 passing through the frame. Positioning pins 17 are provided to hold the pawl grips in or out of the engaging position, holes 18 and 19 being provided in the grips for this purpose. Projecting upwardly from the frame 14 is the superstructure 20 upon which is mounted the hopper 21, said hopper being adapted to be easily turned on the ball bearing 22 mounted between the hopper and the superstructure. Grain is fed into the hopper through the spout 23, which may be connected to a grain elevator or like storage structure (not shown). Slidably mounted on the bottom of the hopper and depending therefrom is a plurality of feed spouts 24, which are provided with valves 25 operated by the handles 26 for controlling grain feed to the hold. The feed spouts are adapted to register with apertures 27 formed in the bottom of the hopper and the spouts at the top are provided with flanges 28 adapted to fit between the leg 29 of the angle iron 30 and the bottom of the hopper, said angle iron being curved as shown in Figure 3 to allow easy erection of said spouts. The spouts 24 are so positioned that they feed the grain on to the inner portion of a disc 31, which is securely mounted on a shaft 32, said shaft being rotatably mounted in a bearing 33 bolted to the frame 14 and in a bearing 34 formed in the ball bearing 22. The shaft may be rotated by any suitable mechanism and, for illustrative purposes, I have shown in Figure 1 a bevel gear 35 mounted on the shaft 32 and adapted to engage with a bevel pinion 36, which is keyed to a shaft 37 rotatably mounted in bearings 38 bolted to the frame. The shaft 37 may be rotated by a belt driven pulley 39, which may be driven from the ship's winch, motor or any other source of power (not shown). The disc 31 is of special formation and is provided with a raised centre 40 of approximately the same height as the outer edge 41, the remaining portion 42 of the disc being curved to form a groove 43, said groove extending from the centre to the outer edge and around the disc, as shown in Figure 1 in cross section. The disc is provided with a plurality of upwardly extending ribs 44 extending from its centre to its outside edge. In the drawing I have shown six ribs, but this number may be increased or decreased according to the size of disc required for any particular size of vessel hold. Modifications may be made in the construction of the device without departing from the spirit of the invention.

In the operation of the device, grain is fed into the hopper through a spout connected to a source of grain supply, and the valves in the spout depending from the under side of the hopper may be opened in such a manner that grain will be fed on to the disc in an even manner and the shaft holding the disc will be evenly loaded. The disc is revolved slowly and, owing to the peculiar grooved shape of said disc, the grain is thrown toward the sides of the hold, as shown in Figure 1. The sides and corners of the hold are filled first and the centre is filled afterwards gradually according to grain placed in the hold. The ribs also assist in collecting the grain on the upper face of the disc and assist in throwing quantities from the upper surface of said disc. The hopper may be rotatably mounted on a ball bearing so that it will be easily turned to ensure an even feed of grain. The frame is very easily attached to the upwardly projecting sides of the hatchway and, as will be seen, the device is readily dismantled and erected as required. The device is designed to reduce the amount of work usually required for filling the holds of vessels or the like and to eliminate all hand trimming of the loaded grain, as is necessary at the present time.

It will be easily understood that the spout valves may be operated to ensure an even spreading of the grain in the hold and, if through any inadvertence the vessel should list, or lean over to one side, certain valves may be closed and the others left open so that the grain may be fed to the higher side of the hold and thereby bring the ship back to the level position.

Having thus described my invention, what I claim is:—

1. A grain loader for the holds of vessels or the like comprising, an adjustable frame adapted to engage with the hatchway, a superstructure mounted on the frame and secured thereto, a hopper mounted on the superstructure, a vertically disposed shaft rotatably mounted in the frame and the superstructure, and adapted to extend below the frame into the hold, a dished disc having ribs extending upwardly from the dished surface said disc being securely attached to the end of the shaft below the frame, and adapted to rotate with said shaft, spouts or pipes depending from the underside of the hopper to guide grain towards the centre of the disc and means for rotating the vertically disposed shaft.

2. A grain loader for the holds of vessels or the like comprising, an adjustable frame, for attaching the device to the hatchways of the holds, a superstructure mounted on and secured to the frame, a hopper mounted on the superstructure, a ball bearing mounted between the superstructure and the hopper to allow of easy rotation of same, a vertically disposed shaft rotatably mounted in the ball bearing and the frame and adapted to extend a short distance into the hold, a disc secured to said shaft and adapted to rotate therewith, said disc being provided with ribs projecting upwardly from its upper surface, spouts or pipes depending from said hopper and communicating therewith, said pipes being adapted to feed grain from the hopper to the centre of the disc, and means for rotating the vertical shaft.

3. In a loader of the character described, the combination of a rotary distributing member, a series of spouts spaced around the central portion of said member and adapted to deliver material thereon, an independent regulating valve controlling each spout, a hopper mounted above said distributing member and supporting the upper ends of said spouts, a vertical shaft supporting said distributing member and means for rotating said shaft.

In witness whereof, I have hereunto set my hand.

ALEXANDER McKAY.